United States Patent Office 3,278,673
Patented Oct. 11, 1966

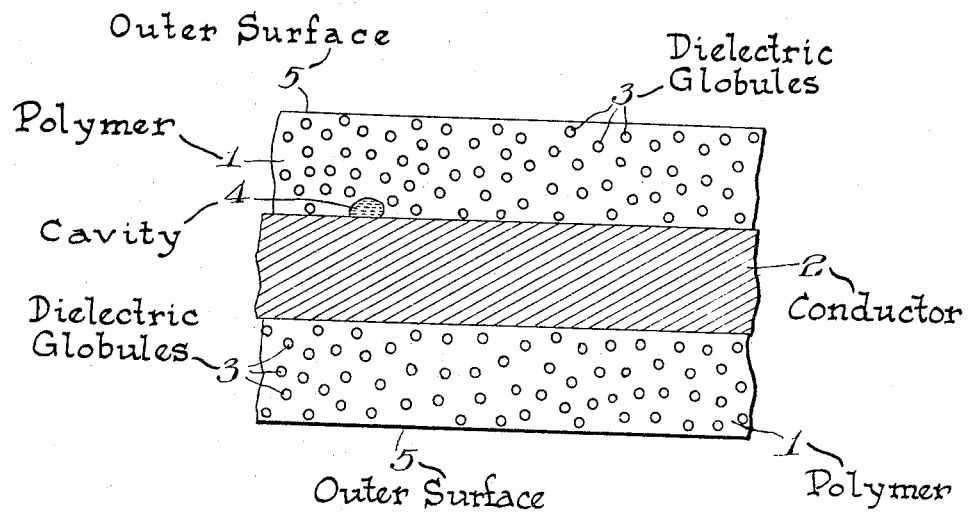

3,278,673
CONDUCTOR INSULATED WITH POLYTETRAFLUOROETHYLENE CONTAINING A DIELECTRIC-DISPERSION AND METHOD OF MAKING SAME
Wilbert L. Gore, Newark, Del., assignor to W. L. Gore & Associates, Inc.
Filed Sept. 6, 1963, Ser. No. 307,772
13 Claims. (Cl. 174—120)

This is a continuation-in-part of my application, S.N. 4,070, filed on Jan. 22, 1960, and now U.S. Patent No. 3,150,207.

This invention relates to the production of corona resistant wire. More particularly, it relates to a new kind of insulated wire and to methods for producing the new wire.

As is well-known, poly(tetrafluoroethylene) is used as an insulating material for electrical wire. It has outstanding properties, being an excellent insulator and being able to withstand considerable heat. Such wire also has good chemical resistance and good electrical strength. However, in many uses of insulated wires the trend is toward the subjection of them to larger and larger amounts of voltage or voltage differentials, and it has become essential to produce new kinds of materials. While a wire insulated in the usual fashion with poly(tetrafluoroethylene) finds wide uses, it cannot be used in certain applications, for it simply cannot withstand the extreme conditions being brought to prevail in these new uses which are increasing in number.

It is known that U.S. 2,454,625 relates to a construction seeking to overcome such shortcomings. But this patent deals with heavy, laminated structures which are braided. Not only are such constructions too heavy and cumbersome for many of the new uses, but laminated structures always are subject to slippage and where decisive, dependable insulation is necessary elimination of faults due to slippage of insulating layers is required. There is an urgent need for insulated wires that can withstand the conditions prevailing in the new uses and that do this dependably.

Accordingly, an object of this invention is the production of new insulated wire. Another objective is the provision of a process for producing new insulated wires that have very high resistances to corona. Still another object is to produce wire uniformly insulated with poly(tetrafluoroethylene) and having a new kind of corona resistance. These and other objectives will appear hereinafter.

The objects of this invention are accomplished by introducing a dielectric fluid into the poly(tetrafluoroethylene) that is to surround or surrounds the metal conductor and then sealing the dielectric fluid in and throughout the insulation about the conductor. The poly(tetrafluoroethylene) that is to be used or is being used as a covering for the metal conductor is brought into contact with a dielectric fluid in a variety of ways in accordance with this invention while the poly(tetrafluoroethylene) is still in an unsintered state. The dielectric fluid is introduced into the interstices of the unsintered polymer to completely or partially fill these pores with the dielectric fluid. With the treated, unsintered poly(tetrafluoroethylene) in position about the metallic conductor, heat is applied to sinter the polymer. The sponge structure collapses during the sintering and some of the dielectric fluid is forced toward the center of the construction, filling the voids in and around the wires. Further, most of the dielectric fluid is broken up into small globular portions which are distributed throughout the insulation, being sealed therein. The outermost surface of the new insulated wire retains the characteristics of wire coated in the normal fashion with poly(tetrafluoroethylene). In certain applications surface characteristics are improved in certain respects, as, for example, with regard to their abrasion resistance. Within the principles of this invention, fillers are added, and new insulated wire having good abrasion resistance and high corona resistance are produced by this invention.

This invention will be further understood by reference to the examples below which are given by way of illustration and are not limitative.

Example I

A length of 0.004 by ¼″ unsintered poly(tetrafluoroethylene) tape was immersed in a polysiloxy fluid, this being a silicone oil known as DOW-Corning 550 and being commercially available. It was immersed until it became transparent, indicating uniform and complete penetration of the fluid. About 100 feet of AWG 22, 7-strand wire, was covered with the impregnated tape by wrapping the wire so that 3 layers of tape covered the entire length. The composite was then passed through an oven at 350° C., being exposed therein for about 2 minutes, time enough to sinter the fluorocarbon polymer and to cause the dielectric fluid to become distributed through the composite. The resultant conductor when cooled was found to have a uniform thickness of insulation of 0.010″±.001″. While it had the normal feeling to the hand of poly(tetrafluoroethylene) coated wires, it was white and opaque rather than transparent as is usual in the absence of the dielectric fluid. The opaqueness was due to the minute globules of dispersed dielectric fluid.

Surprisingly, however, its corona resistance was of a new kind.

Lengths of wire, 15″ long, were cut from the product and immersed in loop form in water containing a wetting agent. Test voltages were applied to the solution and to the end of the wire protruding from the bath. In each instance about 1′ of wire was immersed. Voltages were impressed and the exposure time to produce a failure of the insulation was recorded.

Voltage differentials of 2,000, 3,000, 4,000, 5,000 and finally 6,000 (root-mean-square voltage, 60-cycle A.C.) were impressed for one minute. No failures were found in the product of this invention. Lengths immersed at the 5,000 volt differential were still withstanding the energy of differential after 23–30 hours.

In control experiments wire was produced exactly as above but without using a dielectric fluid of this invention. Some of the conventional wire failed at 3,000 volts, more failed at 4,000 and none withstood the 5,000 test for one minute. Failure of the conventional wire at the 4,000 level occurred after only a few minutes exposure. Failure at the 5,000 level occurred with the conventional wire in a matter of seconds. The insulated wire of this invention held up for hours.

The remarkable corona-resistance of the products of this invention is indeed surprising.

Example II

A long length of wire was wrapped with tape comprising unsintered poly(tetrafluoroethylene) and the silicone used in Example I above. The polymer about the conductor was sintered at 360° C. for one minute. A similar length of wire coated with poly(tetrafluoroethylene), being in the sintered form, was purchased on the market, the particular wire purchased being rated as a top quality wire in the particular field. The two wires the wire produced in accordance with the principles of this invention and the commercially available wire, were of the same size and construction except for the presence of the dielectric fluid in accordance with this invention.

The two wires were then cut into equal lengths and ten of these lengths of each of the two types of wires were placed in water containing a wetting agent, and to initiate corona a voltage differential was applied to each of the 20 wires, this differential being in each case 3,000 volts. After 32 hours all of the commerically available sections had failed, the average length of life under these conditions for these wires being about 15 hours. After 950 hours one-half of the wires of this invention had failed, half still withstanding the corona.

*Example III*

To compare the insulated wires of this invention with top-quality insulated wires available commercially, an equal number of the following wires were tested: (a) a commercially available extruded AWG 22 (7/30) wire having a poly(tetrafluoroethylene) insulation of 0.012″ thickness, (b) a wire similar to (a) in all respects but being tape-wrapped and (c) a wire prepared in accordance with this invention, the insulation thickness being 0.012″. In testing these wires the samples were immersed in an aqueous bath containing a detergent and corona was initiated in each between 1800 and 2600 volts. A 3,000 volt potential was maintained, and a record was kept as to the time needed to effect the failure of each sample.

At the end of 15 hours 60% of the commercial wires (a) and (b) had failed and at the end of 30 hours all of these wires had failed. In sharp contrast to this, the first failure of a wire (c) of this invention did not occur until after 60 hours of exposure and even after 875 hours of exposure 50% or more of the wires (c) were still intact. Because of the long life the test was not carried out to determine the end point, if any, but it was concluded that the average life under this corona stress of 3,000 volt potential was at least 875 hours and that with uniformity of production accompanying commercialization, life spans under these stress conditions would be indeed much longer.

*Example IV*

A mixture of 200 grams of poly(tetrafluoroethylene) in the form of a dried powder obtained from commercially available dispersions, 20 grams of glass bubbles being in the size of 15–300 microns, 56 cc. of a hydrocarbon, such as naphtha, and 20 cc. of DOW-Corning 550 was prepared by tumbling the ingredients together until good, uniform mixing resulted. The resultant mixture was then extruded through a die containing two orifices in series, the first designed to extrude the material in the form of a rod stretching it longitudinally and the second being in the form of a slit orifice designed to extrude the rod material coming to it in the form of a thin ribbon, thus stretching the material laterally and producing a sheet or ribbon of long length. The resultant tape, stretched longitudinally and laterally, was about 0.030″ thick. It was reduced to a thickness of 0.004″ by rolling, and the hydrocarbon was removed by evaporation. From the resultant ribbon was cut a strip one-half inch in width and this was wrapped on a wire to form three overlaps. The resultant wrapped wire was heated at 350° C. for about one minute, effectively sintering the poly(tetrafluoroethylene) throughout the composite and trapping the dielectric fluid in accordance with this invention. The resultant wire had about 0.010″ of insulation. The density of this insulation was about 1.7; the dielectric constant was about 1.6–1.7. The abrasion resistance was considerably improved and the resistance to cold flow was greatly improved over unfilled, sintered poly(tetrafluoroethylene) normally found on conventional insulated wires. Besides having the advantages of much better abrasion resistance and resistance to cold flow, the insulation produced did not break down when tested at a 3,000 volt differential as described above after 75 hours of immersion in the test bath.

*Example V*

A powder containing 200 grams of poly(tetrafluoroethylene), 20 grams of potassium titanate fibers, 56 cc. of a hydrocarbon and 20 cc. of the silicone, DOW-Corning 550, was produced as in Example IV and it was converted to a tape in the same manner as described in Example IV above. Again the ribbon used had a thickness of about 0.030″ which was further reduced by rolling to about 0.004″.

The wire was taped wrapped as described in Example IV and sintered at 350° C. The density of the coating was found to be about 2.2 and the dielectric constant about 212. Greatly improved abrasion resistance and resistance to cold flow were obtained. The insulated wire had the great corona resistance possessed by the wires of this invention.

A further advantage was noted in the wire of this example. When the wire was heated with a blow torch, the organic material was quickly volatilized but about the wire was a matted covering of the inorganic potassium titanate. The mat about the wire is an effective insulation under emergency conditions, and the flame resistance of the wire makes it applicable for aircraft and shipboard uses and for re-entry applications in missile work, as, for example, in nose cone construction.

*Example VI*

A mixture of 400 grams of poly(tetrafluoroethylene), 100 cc. of hydrocarbon and 35 cc. of DOW-Corning 550 fluid was tumbled and then extruded as described in Example V to produce a ribbon. This was reduced in thickness from about 0.030″ to 0.015″. Two lengths of this unsintered poly(tetrafluoroethylene) tape were then passed between two opposing cylindrical rolls simultaneously with a metallic conductor lying between the two sheets the said rolls having indexing ridges and a groove lying between the said ridges through which the metallic conductor passed. By this operation a coated wire was obtained, the unsintered polymer being thoroughly pressed together in a tight weld. The composite had a small web or membrane extending from two sides, these webs being formed where the two sheets were pressed together at the ridged areas of the grooves. After sintering about one minute at 360° C., the wire was tested and it was found to have corona resistance far in excess of any conventional wire.

In related experiments the mixture of tetrafluoroethylene/dielectric material is extruded about the wire rather than being converted to tape for wrapping. The mixtures, with or without fillers, extrude smoothly about metal conductors, and the articles from the extrusion procedures have corona resistance comparable to those from the tape wrapping or calendering methods.

In another experiment, a plurality of conductors were passed simultaneously through cooperating cylindrical rolls having ridges and grooves corresponding in a number and size to the wires being treated. The resultant composite was a ribbon containing a number of conductors embedded or surrounded with the polymer, each of the conductors being connected to the adjacent conductor or conductors by a web of the polymer. After this assembly was sintered in the normal fashion for one minute at 360° C., it was found to have corona resistance throughout the entire lengths for each of the conductors which corona resistance corresponded in value to that described in Example II above.

It should be noted that in the production of the articles of this invention by calendering or tape wrapping there is no formation of layers or laminations that can be broken or that can slip over one another. The sintering produces a bonded, homogeneous or unitary insulation about the conductor and in all the methods of this invention the thickness of the insulation about a given conductor is uniform in thickness.

Example VII

An assembly comprising a multiple number of metallic conductors was produced by calendering two sheets of unsintered poly(tetrafluoroethylene) simultaneously with the metallic conductors. The resultant assembly was then immersed for 5 minutes in a bath containing 200 cc. of a hydrocarbon and 100 cc. of a silicone, being DOW-Corning 200. It was then removed, wiped dry and warmed to remove the very volatile hydrocarbon. Following this, it was sintered at 350° C. for about one minute. The resultant multi-conductors were placed in the corona testing bath and no failures at 5,000 volts differential were found after 100 hours of exposure.

Example VIII

A mixture of 200 grams of poly(tetrafluoroethylene) in the form of a dried powder and 256 cc. of carbon tetrachloride in which 20 g. of tetrafluoroethylene telomer is dissolved is prepared by tumbling the ingredients together. The telomer, a solid, is a wax-like material and is readily prepared by polymerizing tetrafluoroethylene using methyl alcohol as the telomerization agent. The resultant mixture is then extruded as described in Example IV to produce a strong, uniform tape. The carbon tetrachloride is evaporated and a conductor is insulated by wrapping it with this tape or by the method of Robert W. Gore described in U.S. 3,082,292 to produce excellent corona-resistant conductors.

The wax-like telomer is liquid under conditions of corona discharge, the wax-like solid acting as a dielectric liquid of this invention. The telomer conforms to a polymer of the formula, $(C_2F_2)_n$ where $n=>10<100$. Similar wax-like products that can be used in this invention are prepared from telomerization of fluorinated propylene, or chlorotrifluoroethylene or copolymers of these or ethylene with tetrafluoroethylene. Also, other dielectric solids may be used with similar results such as perfluorinated hydrocarbons.

As is discussed hereinafter the dielectric material is used in amounts up to about 25% based on the combined weight of the fluorocarbon polymer and the dielectric material, and it is a material that is thermally stable under the sintering and corona discharge conditions, these involving temperatures of around 330° C. Further, the material has a boiling point higher than about 330° C. and is a liquid under the conditions of corona stress. Thus, when solids are used they are low-melting or melt under sintering or corona discharge conditions.

From the above it is seen that in this invention a high-boiling dielectric fluid is introduced into the interstices of an unsintered poly(tetrafluoroethylene) coating that surrounds the metal conductor. Most of the dielectric fluid is subsequently trapped as small globules throughout the poly(tetrafluoroethylene) insulation; the small globules of dielectric fluid serve to stop the growth of corona cavities that would otherwise enlarge through the insulation causing it to fail. Before sintering, the poly(tetrafluoroethylene) coating is spongy, containing open cells. These cells are completely or partially filled with the dielectric fluid, and then heat is applied to sinter or coalesce the poly(tetrafluoroethylene). During this coalescing, the dielectric fluid is partially forced ahead of the collapsing sponge structure, partially trapped within the coalesced material, producing a structure containing minute globules of dielectric fluid trapped in closed-cell pores within the poly(tetrafluoroethylene) and completely surrounded by it. When the sintering is carried out by passing the wire covered with the unsintered coating through a furnace heated to from 330°–450° C., the coalescing first occurs at the surface and then proceeds, inward, through the insulation toward the center. Thus, the portion of the dielectric fluid driven ahead of the collapsing sponge as it coalesces and not trapped as globules is forced to the center and fills any interstices at the junction of the metal conductor and insulation. The presence of the dielectric material on the wire has been shown by removing the sintered insulation and immersing the wire in a solvent for the dielectric material, evaporating the solvent and testing the residue for the presence of the material.

If inorganic fillers have been dispersed throughout the unsintered poly(tetrafluoroethylene) insulation, each of these particles is bathed in dielectric fluid as the fluid is driven through the sponge structure by the sponge-collapse attending the coalescing of the poly(tetrafluoroethylene) when heated above its melting temperature. Normally when poly(tetrafluoroethylene) is subsequently cooled and solidified, it shrinks approximately 25% in freezing, tending to pull away from each particle of filler material and leaving a micro-cavity at the policy(tetrafluoroethylene)-filler interface. These cavities are sites for corona initiation and rapid growth leading to insulation failure in the conventional structures but in those of this invention the cavities are either filled with dielectric fluid or prevented from growing by its presence. Thus, the invention makes possible the introduction of fillers into poly(tetrafluoroethylene) to improve its abrasion resistance, lessen its plastic flow under stress, reduce its dielectric constant, and improve other mechanical and electrical characteristics without loss of corona resistance or dielectric strength. Without the dielectric fluid, filled poly(tetrafluoroethylene) does not make a satisfactory insulation for use under conditions where corona may occur.

As is well-known, when a sufficient voltage gradient is imposed across a dielectric material, ionization (corona) occurs in gases trapped in micro-cavities within the dielectric material or at its interfaces with other surfaces. With alternating voltages these ions are accelerated back and forth with each reversal of the field, so they repeatedly collide against the walls of the cavity, enlarging it by the mechanical and thermal action of their impacts, and finally enlarging the cavity to where the insulation fails. This is known as a corona failure. If the walls of such a cavity are covered with or composed of a dielectric fluid, the enlargement process is greatly slowed, for the fluid is able to absorb ion impacts and recover, flowing back to cover the surface or fill the dent where the impact occurred. The globules of dielectric fluid are dispersed throughout the insulation so that an enlarging corona-cavity soon encounters one of these globules and its growth is stopped by the dielectric fluid.

As shown in the drawing, taken from microscopic examination of the products, the fluorocarbon polymer 1 surrounding the metal conductor 2 has scattered throughout the polymer tiny, substantially, spherical globules 3 of the dielectric material. These droplets are about 1 micron in size and they are quite uniformly distributed throughout the mass of the fused polymer. From this and the figure it can be seen that a cavity such as 4 that might be formed under corona stress is surrounded by droplets of the dielectric fluid and that the number of globules per unit volume is so great that it is virtually impossible for the cavity to reach the outer surface 5 of the insulation. The size of the dispersed droplets may vary from about 1 micron to about 10 microns, but generally it is preferred to have the size be in the range of about 1 to about 5 microns. Each droplet is spaced from adjacent droplets by a distance of about 3 to about 10 microns.

The dielectric fluids used in the process and the products of this invention are high-boiling materials, having boiling points of about 330° C. or higher. In order to effect their migration or movement during the sintering step, it is preferred that the dielectric fluids have viscosities not over about 3,000 centistokes at 25° C. However, even solid dielectric material of low melting temperature may be used, for they are dissolved in the carrier prior to the mixing step with the unsintered poly(tetrafluoroethylene) powder. During the sintering of the poly(tetrafluoroethylene), the solid dielectric materials melt and flow and there is intimate contact between the poly(tetrafluoroethylene) and the dielectric material as well as between those components and the metal wire. Under the corona discharge the effective solids melt and become liquids. While it has been found that solids may be used, it is preferred to use the liquids.

The dielectric materials may be selected from a number of chemicals including the silicone oils, as, for example, the DOW-Corning 200 or 550 silicone oil series, corresponding siloxy oils containing chlorine or other halogen substituted side groups, perfluorinated materials such as perfluorinated kerosene and perfluorinated lubricating oils, such materials as pyromellitic ester of fluorinated alcohols, as, for example the pyromellitic ester of perfluoro-n-octanol and many other materials. The principle requirements of the dielectric materials used in this invention are that they may be thermally stable so that they do not adversely break down during the sintering step, the other requirement being that they have good dielectric strength in the final product. This dielectric strength embodies the ability of the dielectric fluid or solid to act as an excellent insulation and to stop ionic discharges or to absorb them with a minimum breakdown.

It is preferred to use the organopolysiloxanes. These have structures represented by the type formula

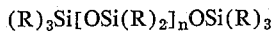

wherein $n$ is from 0 to about 2,000 or so and the R groups are usually alkyl radicals such as methyl, ethyl, butyl, isopropyl and the like. Mention may be made of such materials as polyisobutylsiloxane, polyphenylsiloxane, polyethylsiloxane, poly(fluorinated diphenyl) siloxane and other halogenated, such as the chlorinated siloxanes, poly (methyl, phenyl) siloxane and similar siloxanes in which the R groups differ. From brochures of said DOW-Corning and from other sources, the "DOW-Corning 200" referred to above is polymethylsiloxane and the said "DOW-Corning 550" is a poly(methyl, phenyl) siloxane. The dielectric fluids employed, be they siloxanes or other materials, have unusual heat stability, resistance to moisture and resistance to oxidation. In addition to their fluidity during the sintering, they possess boiling points of at least about 330° C. and are stable at this temperature for at least a few minutes. During the sintering step, retention of the dielectric fluid within the insulation is desired, and its loss by evaporation or other ways is minimized.

In sintering the poly(tetrafluoroethylene), temperatures about 327° C. are generally employed. While temperatures of about 330° C. to about 400° C. are usually employed, higher temperatures may be used but the particular temperature used in a given instance will depend upon such factors as the thickness of the insulation, the amount of dielectric fluid therein, its viscosity, its boiling point, among other conditions and the particular heating time will be similarly judged. For effective retention of the dielectric material and for greatest economy, one will generally use the minimum amount of fluid to effect the desired corona resistance and will effect sintering quickly at minimum temperatures. Most of the sintering is effected within about 4 to about 5 minutes at temperatures in the range of about 330° C. to about 390° C., and preferably within about 2 minutes at temperatures of about 340° C. to about 360° C. Occasionally it may be desired to mix an excess of the dielectric fluid with the insulating polymer prior to sintering and to allow for loss by evaporation during removal of the carrier or during sintering. In any event, any loss of dielectric fluid is prevented or controlled so that the final product contains the dielectric fluid dispersed throughout the insulating material in effective quantities.

It has been found that generally it is not necessary to exceed 25% by weight. Amounts in excess thereof afford no advantage. While improved corona resistance has been noted in certain instances with certain dielectric fluids in amounts less than 1%, it is preferred to use the dielectric material in amounts from about 3% to about 15% by weight, based on the combined weight of the fluorocarbon polymer and dielectric fluid. While this invention has been described mainly with reference to poly(tetrafluoroethylene), the principles of this invention apply to other fluorocarbon polymer such as poly(chlorotrifluoroethylene) or copolymers of tetrafluroethylene with ethylene or with fluorinated propylenes, such as hexafluoropropylene, or with chlorotrifluoroethylene. Of the various fluoroethylene polymers, poly(tetrafluoroethylene) is of the greatest interest since its physical and chemical characteristics coupled with the dielectric fluids of this invention virtually eliminates failure under corona stress.

From the above examples it can be easily seen that the products of this invention can be produced in a variety of ways. The dielectric fluid may be used while the coating material is being applied in extrusion processes either admixed with the coating material being extruded or simultaneously mixed and extruded. In another method the unsintered poly(tetrafluoroethylene) coated wire is soaked in the dielectric fluid and the resultant fluid-loaded assembly is sintered. If desired to tape on the coating, the material to be applied is soaked prior to wrapping and the assembly is then sintered. Tape may be extruded and rolled using the dielectric fluid as an extrusion aid or as a part of the extrusion aid. Unsintered sheets of poly(tetrafluoroethylene) containing the fluid may be calendered onto wire and the assembly sintered or the sheets may be first calendered, followed by soaking the assembly in the fluid and then sintering. All of these approaches give good corona resistance. However, some of the techniques require less effort and time to produce top results. Of the various methods it is preferred to use the dielectric fluids of this invention as a component of the extrusion aid in either manufacturing the coated wire or in manufacturing the tape to coat the conductor. However, in the various processes of this invention outstanding corona resistance is obtained.

When the fluoroethylene polymer and the dielectric fluid are brought into each other's presence with the aid of a carrier such as a hydrocarbon, a volatile material is used such as naphtha, kerosene, cyclohexane, acetone, alcohol and similar materials. Usually the liquid carrier and the dielectric material are mixed in ratios of 75% and 25% by volume, although this ratio will vary considerably depending upon the dielectric material and the amount of it to be incorporated in the fluorocarbon polymer. In any event the common solvents used are unreactive to the polymers and dielectric fluids and are readily removed from their mixtures by evaporation at low temperatures. Further, they may also be used when fillers are employed. Various fillers can be incorporated such as inorganic materials as mica, silica and titanium dioxide as well as the glass and potassium titanate exemplified above. Of the large variety of fillers that can be added it is preferred to add those which either decrease the density of the final articles or provide for retention of the conductor under destructive conditions or both.

This invention provides a process for avoiding formation of voids which normally attend the sintering of tertafluoroethylene polymers. Unlike and, in fact, in contradistinction to U.S. 2,644,802, the siloxanes of this invention are retained within the sintered polymer; the dielectric materials are not removed. They are retained and are vital in the prevention of corona failure and in making possible the production of filled, corona-resistant tetrafluoroethylene polymer which is useful in a variety of forms, as, for example, gaskets, shields, insulation, coatings and the like.

Production of corona-resistant, lightweight conductors through the use of the dielectric fluids and glass bubbles of this invention is an important advance in aircraft and missile wirings. Similarly, the production of articles which can withstand long-term service at temperatures of 480° C. or so is most important in missile recovery or in applications where the fluorocarbon may be destroyed by heat.

As compared to an average corona-stress life of only about 15 hours for top-grade, presently available conductors insulated with poly(tetrafluoroethylene), the conductors of this invention have an average life of about 875 hours. Not only does this invention eliminate the problem of fractures and flaws which occur in the conventional processes, it affords low density, heat resistant structures which have no voids leading to low corona-resistance. Coaxial constructions which are not heavy nor cumbersome may be produced economically, and these are miniature in size relative to conventional cables. Further, the articles of this invention have low dielectric losses, are flame resistant and their surfaces can, through the use of fillers in accordance with this invention, be considerably improved in cold flow making them less subject to shorting through the cutting of the insulation inadvertently as, for example, by undetected pressure of a foreign object on the insulation.

While the invention has been disclosed herein in connection with certain embodiments and certain structural and procedural details, it is clear that changes, modifications or equivalents can be used by those skilled in the art; accordingly, such changes within the principles of this invention are intended to be included within the scope of the claims below.

I claim:

1. A process for producing an insulated conductor which comprises distributing a dielectric material throughout an unsintered tetrafluoroethylene polymer, said material comprising a polysiloxane present in globular form and in an amount not exceeding about 25% by weight based on the combined weight of said material and said polymer and having a boiling point greater than about 330° C. and being thermally stable at the sintering temperature of said polymer and being liquid under conditions of corona discharge; covering a conductor with the resultant mixture; and heating the conductor covered with the resultant mixture of unsintered tetrafluoroethylene polymer/dielectric material at a temperature at least as high as the sintering temperature of the said polymer to sinter the said polymer, thus sealing the said dielectric material therein.

2. A process in accordance with claim 1 in which the resultant assembly is heated to a temperature of at least 330° C. for less than about 5 minutes to effect said sintering.

3. A process in accordance with claim 1 in which the said amount is about 3% to about 15%.

4. A process in accordance with claim 1 in which said dielectric material is a polyorganosiloxane.

5. A process in accordance with claim 1 in which the placement of said mixture around said wire is effected by extrusion.

6. A process in accordance with claim 1 in which the said covering step is effected using a pellicle made from the said resultant mixture.

7. As a new article of manufacture an insulated wire comprising a metal conductor surrounded by an unsintered tetrafluoroethylene polymer containing a dielectric material dispersed and sealed therein in globular form, the amount of said material not exceeding about 25% of the combined weight of said polymer and said material and said material having a boiling point greater than about 330° C. and being thermally stable at the sintering temperature of said polymer and being liquid under conditions of corona discharge.

8. An article in accordance with claim 7 in which said dispersed material is in the form of globules varying in size from about 1 micron to about 10 microns in diameter.

9. An article in accordance with claim 7 in which said dispersed material is a polysiloxane.

10. An article in accordance with claim 7 in which said polymer is poly(tetrafluoroethylene).

11. An article in accordance with claim 7 in which said polymer has been subsequently sintered.

12. An article in accordance with claim 7 in which said amount of said dielectric material is about 1% to about 25%.

13. An article in accordance with claim 7 in which said amount of said dielectric material is about 3% to about 15%.

References Cited by the Examiner

UNITED STATES PATENTS

| 2,710,266 | 6/1955 | Hochberg. |
| 2,865,795 | 12/1958 | Morrison _____ 117—230 |

FOREIGN PATENTS 1,064,995   12/1953   France.

OTHER REFERENCES

German printed application, 1,029,896, May 1958.

LEWIS H. MYERS, *Primary Examiner.*

LARAMIE E. ASKIN, JOHN F. BURNS, ROBERT K. SCHAEFER, *Examiners.*

D. A. KETTLESTRINGS, H. HUBERFELD,
*Assistant Examiners.*